Figure 1:
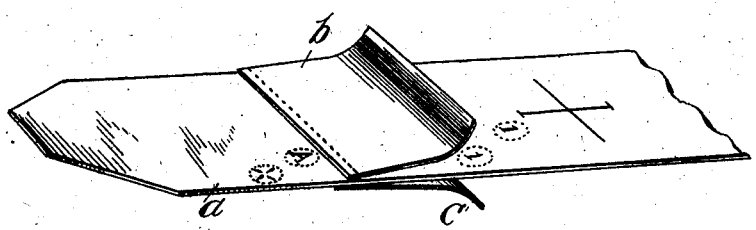

No. 762,816. PATENTED JUNE 14, 1904.
H. FRITZSCHE.
ROLL FILM FOR PHOTOGRAPHIC PURPOSES.
APPLICATION FILED MAR. 20, 1903.
NO MODEL.

Witnesses
J. F. Pattison
Fred W. English

Inventor
Hugo Fritzsche
By Wilkinson + Fisher
Attorneys

No. 762,816. Patented June 14, 1904.

UNITED STATES PATENT OFFICE.

HUGO FRITZSCHE, OF LEIPZIG, GERMANY.

ROLL-FILM FOR PHOTOGRAPHIC PURPOSES.

SPECIFICATION forming part of Letters Patent No. 762,816, dated June 14, 1904.

Application filed March 20, 1903. Serial No. 148,719. (No model.)

*To all whom it may concern:*

Be it known that I, HUGO FRITZSCHE, a subject of the King of Saxony, residing at Leipzig, in the Kingdom of Saxony, German Empire, have invented certain new and useful Improvements in Roll-Films for Photographic Purposes, of which the following is a specification.

My invention relates to a rollable film which when prepared for use within the camera is wound upon a spool and during the process of exposure is unwound from it across the focal plane and wound up upon another or receiving spool in a manner well understood. More particularly described, the invention relates to a rollable film embodying a continuous strip having sections which alternately serve as focusing-surfaces and supporting-surfaces for detachable sensitized sheets or films, which films or sheets are suitably protected by opaque or non-actinic material against the action of light. The strip projects at both ends sufficiently far beyond the said alternating sections to lap several times about the completely-rolled spool, whether it be the stock or receiving-spool, to render the same "daylight-loading," as that term is now well known and understood.

The object of my invention is to so make the rolling film as to render a special focusing-plate for adjusting the camera unnecessary and, further, to render possible the feeding of the film without the aid of a protecting-cover on the rear side of the camera if such construction is desired.

According to my invention the films are disposed on a supporting and conducting strip which may serve alternately as a protecting-sheet and as a focusing-surface. The films or sheets of sensitized material are detachably attached to this strip independently of each other, being separated by the focusing-sections of the strip, so that any desired film or negative may be removed from the strip when in the dark room without injuring it or the strip and without disturbing the remaining films or sensitized sheets whether exposed or not, and the construction is such that the strip bearing the separate sensitized sheets may be made up into the so-called "daylight-loading" rolls or cartridges. The manufacture and rolling of the complete films is exceedingly simple, and the manual work in the dark room is reduced to a minimum.

The supporting and conducting strip, which also affords the protecting means for the sensitized sheets and the focusing-surfaces, can be produced in various ways. For example, it is preferably made as a continuous seamless strip of translucent material colored with some suitable non-actinic coloring-matter—for example, red—which is suitable for focusing, but will neutralize the actinic light, so that the sensitized sheets will not be injured, or the sheets of films themselves may be lined or coated on their backs with soluble opaque or non-actinic material having suitable characteristics which are well known, or the supporting and conducting strip may be colored or varnished with opaque material at the places opposite which the sensitized films are attached, or supplemental light-excluding sheets may be attached to the strip behind the sensitized sheets of film, which likewise are attached to the strip. In all cases the separate films or sensitized sheets are pasted or otherwise secured to the supporting-strip along one edge only, it being the leading edge, as the films are led across the focal plane. The strip should consist of sufficiently strong material to properly effect its purpose, and if so it may be repeatedly used. It may be of celluloid, paper, cloth, or other suitable material to serve the purpose stated. The supporting-strip may be supplied with numerals or other designations on its back observable through a suitable opening in the camera for the purpose of adjusting the sensitized sheets or films and also the focusing-sections of the strip in proper position in the camera, whereby focusing and exposure may be properly effected, and it may also be provided with perforations to facilitate the attachment of the films to it.

Figure 2:
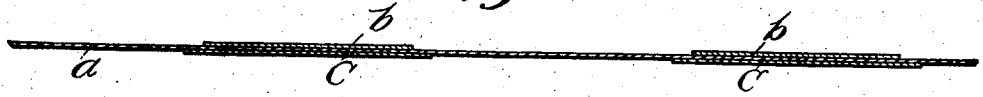
Figure 3:
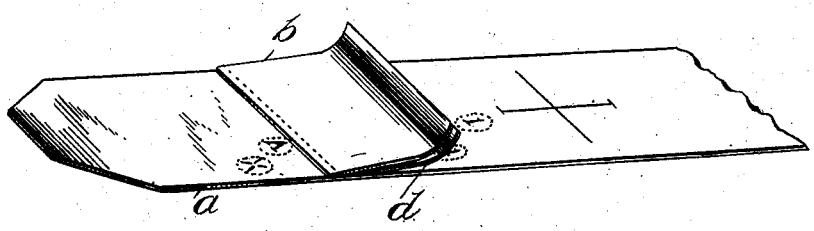
Figure 4:
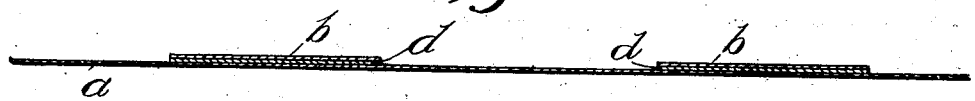

In the accompanying drawings, Figure 1 illustrates a perspective view of one end of a rollable film constructed in accordance with my invention. Fig. 2 illustrates a cross-section of the same. Fig. 3 illustrates a similar perspective view showing a modified form. Fig. 4 illustrates a cross-section of said modified form.

$a$ represents the supporting-strip, made of any desirable material, preferably of a translucent non-actinically-colored substance, whereby its alternate sections may serve as focusing-surfaces and as protecting-surfaces for the sensitized sheets.

$b$ represents the sensitized sheets or film attached at one edge only to the strip $a$.

$c$, Figs. 1 and 2, represents a screen or cover of opaque material attached to the strip $a$ opposite or behind the sensitized sheets, but on the opposite side of the strip. They are used as auxiliary or supplemental to the strip $a$ for the protection of the sensitized material.

$d$, Figs. 3 and 4, represent sheets of opaque material placed between the sensitized sheets or films and the strip $a$ and attached with them to the strip.

The sheets $c$ and $d$ are made of opaque material, such as black paper or suitable non-actinically-colored material, or, as a substitute for them, the sensitized sheets or films may themselves have applied to their rear sides a soluble opaque or non-actinic coating of suitable material, or, if preferred, such coating may be applied to the supporting-strip $a$ opposite or in rear of the separate sensitized sheets or films, excepting that it need not be soluble if applied to the strip.

Having thus described my invention, what I claim as new, and desire to secure by Letters Patent of the United States, is—

1. A roll-film consisting of a continuous translucent supporting-strip, sensitized films secured to said supporting-strip at intervals, and opaque material behind the sensitized films, substantially as described.

2. A roll-film consisting of a continuous translucent supporting-strip, sensitized films secured to said supporting-strip at intervals, and screens of opaque material secured to said supporting-strip between said strip and said sensitized films, substantially as described.

3. A roll-film consisting of a continuous supporting-strip of translucent material, sensitized films secured at one edge to said strip at intervals, and opaque screens located between said films and said supporting-strip and secured to said strip, the three layers being secured together, substantially as described.

In testimony whereof I have signed my name to this specification in the presence of two subscribing witnesses.

HUGO FRITZSCHE.

Witnesses:
   PAUL MÜLLER,
   LUDWIG KLEIN.